(12) United States Patent
Chan

(10) Patent No.: US 9,639,845 B2
(45) Date of Patent: May 2, 2017

(54) METHOD AND SYSTEM FOR DISPLAYING ONLINE ADVERTISEMENTS

(75) Inventor: Shan-Bin Chris Chan, Yuanlin Town (TW)

(73) Assignee: Yahoo! Inc., Sunnyvale, CA (US)

( * ) Notice: Subject to any disclaimer, the term of this patent is extended or adjusted under 35 U.S.C. 154(b) by 965 days.

(21) Appl. No.: 12/187,317

(22) Filed: Aug. 6, 2008

(65) Prior Publication Data

US 2010/0036730 A1 Feb. 11, 2010

(51) Int. Cl.
G06Q 40/00 (2012.01)
G06Q 30/02 (2012.01)

(52) U.S. Cl.
CPC ......... *G06Q 30/02* (2013.01); *G06Q 30/0253* (2013.01); *G06Q 30/0277* (2013.01)

(58) Field of Classification Search
CPC ......... G06Q 40/00; G06Q 20/22; G06Q 20/29
USPC .......................... 705/1–50; 707/3; 715/1–235
See application file for complete search history.

(56) References Cited

U.S. PATENT DOCUMENTS

| | | | |
|---|---|---|---|
| 7,065,520 B2 | 6/2006 | Langford | |
| 7,139,696 B2 | 11/2006 | Tokieda et al. | |
| 7,688,723 B1 | 3/2010 | Lo et al. | |
| 7,801,909 B2 | 9/2010 | Poltorak | |
| 7,831,476 B2* | 11/2010 | Foster et al. | 705/26.8 |
| 7,953,730 B1 | 5/2011 | Bleckner et al. | |
| 2002/0032677 A1 | 3/2002 | Morgenthaler et al. | |
| 2003/0187726 A1* | 10/2003 | Bull | G06F 17/30067 705/14.1 |
| 2004/0073660 A1 | 4/2004 | Toomey | |
| 2005/0086109 A1 | 4/2005 | McFadden et al. | |
| 2006/0122992 A1 | 6/2006 | Bellaiche et al. | |
| 2006/0277167 A1* | 12/2006 | Gross et al. | 707/3 |
| 2007/0118794 A1* | 5/2007 | Hollander et al. | 715/512 |
| 2007/0157106 A1* | 7/2007 | Bishop | 715/771 |
| 2007/0208610 A1 | 9/2007 | Pisaris-Henderson et al. | |
| 2008/0021878 A1 | 1/2008 | Jeong | |
| 2008/0049704 A1 | 2/2008 | Witteman et al. | |
| 2008/0082381 A1 | 4/2008 | Muller et al. | |
| 2008/0082512 A1 | 4/2008 | Hogan et al. | |

(Continued)

OTHER PUBLICATIONS

Wen-tau Yih et al., Finding Advertising Keywords on Web Pages, May 2006, Microsoft Research, web, 1.*

*Primary Examiner* — Marissa Liu
(74) *Attorney, Agent, or Firm* — Brinks Gilson & Lione

(57) ABSTRACT

A system and method for increasing displaying time of online advertisements. Upon receiving a search request including one or more search terms, a search engine may identify a list of search results and display the search results on one side of a result page. The search engine may also obtain a list of advertisements and display the list of advertisements on the other side of the result page. When a user scrolls down to look at search results at a lower portion of the result page, the list of advertisements may be moved down, following the movement of the screen, so that at least a part of the list of advertisements may keep being displayed on the current screen. Since the online advertisements are visible to the user for a longer time, there are more opportunities for the online advertisements to get the user's attention, and consequently more opportunities for the user to click on an advertisement. As a result, the efficiency of online advertising may be improved.

20 Claims, 4 Drawing Sheets

(56) References Cited

U.S. PATENT DOCUMENTS

| | | |
|---|---|---|
| 2008/0098300 A1 | 4/2008 | Corrales et al. |
| 2008/0183573 A1* | 7/2008 | Muschetto ............ G06Q 30/02 705/14.41 |
| 2008/0220747 A1* | 9/2008 | Ashkenazi et al. ........ 455/414.1 |
| 2008/0244429 A1 | 10/2008 | Stading |
| 2008/0294524 A1* | 11/2008 | Badros et al. .................. 705/14 |
| 2009/0024467 A1 | 1/2009 | Fontoura et al. |
| 2010/0036730 A1* | 2/2010 | Chan ......................... 705/14.51 |
| 2010/0036733 A1 | 2/2010 | Chan et al. |
| 2012/0095848 A1 | 4/2012 | Chan |

\* cited by examiner

METHOD AND SYSTEM FOR DISPLAYING ONLINE ADVERTISEMENTS

CROSS REFERENCE TO RELATED APPLICATION

The present application is related to the following U.S. Patent Application, which is assigned to the assignee hereof and incorporated herein by reference in its entirety: U.S. patent application Ser. No. 12/187,324, entitled Method and System for Dynamically Updating Online Advertisements, and filed concurrently herewith.

BACKGROUND

1. Field of the Invention

The present invention relates generally to online advertising, and more particularly to display of online advertisements.

2. Description of Related Art

A search engine may allow users to search for web pages or other materials accessible over the Internet with one or more search terms. After receiving from a user a search request including one or more search terms, a search engine may parse the search term(s) from the search request, identify web pages that may be related to the search term(s), and display on a result page information about the web pages as a list of search results, e.g., a link to a web page containing the search term(s). The search results may be ranked according to their relevance to the search terms, with the most relevant search result being positioned at the top of the list. The relevance may be determined according to search engine algorithms of a search engine service provider.

The search engine service provider may also display advertisements as a separate list on a result page displaying the search results. The search engine service provider may sign contracts with a number of advertisers (e.g., Macy's™, and GM™), and display a link to an advertiser's website when a search term in a search request is related to the advertiser's products or services. For example, when the search terms include "camera," a list of relevant search results may be displayed at one portion of a result page, and a list of advertisements may be displayed at another portion of the result page. An advertisement may include some brief information about a camera manufacturer or a camera store, and a link to its website. An advertiser may be charged according to the number of clicks on its link (Pay Per Click) or the number of times its advertisement is displayed (Pay Per Impression). Since the advertisements are related to the search term(s) of a search request, it is more likely that the user will be interested in the advertisements, and in this way advertising may be better targeted at users.

The list of relevant search results may take up a number of result pages, and each result page may expand over several screens. However, the list of advertisements may be shorter than a screen. Some currently available solutions start to display the list of advertisements from the top of a result page. The position of the advertisement list is fixed and static. When a user scrolls down to look at search results at a lower portion of a result page, the upper portion of the result page, including the advertisements, may move off the current screen and may not be visible to the user anymore. Advertisers may lose advertising opportunities and the search engine service provider may lose revenue.

Therefore, it may be desirable to provide a system and method which may help to improve the efficiency of online advertising.

BRIEF DESCRIPTION OF THE DRAWING FIGURES

Embodiments of the present invention are described herein with reference to the accompanying drawings, similar reference numbers being used to indicate functionally similar elements.

DETAILED DESCRIPTION

The present invention provides a system and method for increasing display time of online advertisements. Upon receiving a search request including one or more search terms, a search engine may identify a list of search results and display the search results on one side of a result page. The search engine may also obtain a list of advertisements and display the list of advertisements on the other side of the result page. When a user scrolls down to look at search results at a lower portion of the result page, the list of advertisements may be moved down, following the movement of the screen, so that at least a part of the list of advertisements may keep being displayed on the current screen. Since the online advertisements are visible to the user for a longer time, there are more opportunities for the online advertisements to get the user's attention, and consequently more opportunities for the user to click on an advertisement. As a result, the efficiency of online advertising may be improved. The invention may be carried out by computer-executable instructions, such as program modules. Advantages of the present invention will become apparent from the following detailed description.

Figure 1:
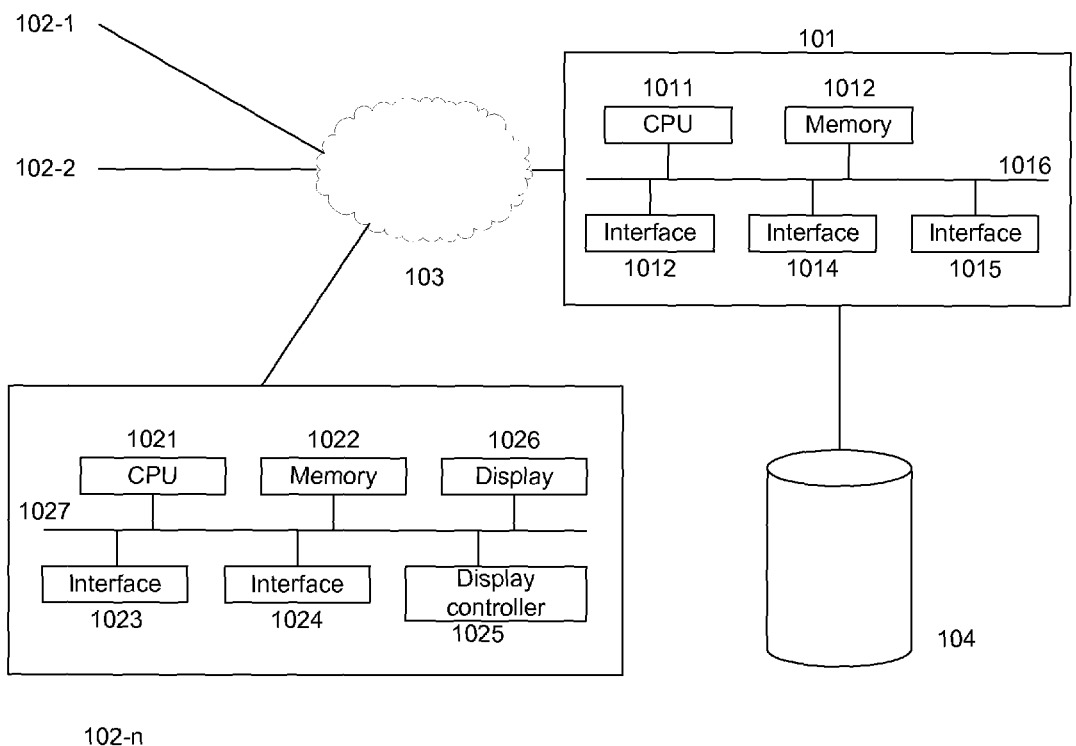
FIG. 1 illustrates an online advertising system in which a system of the present invention may be used.

FIG. 1 illustrates an online advertising system in which a system of the present invention may be used. As shown, a number of user terminals 102-1, 102-2, . . . 102-*n* may communicate with a data server 101 over a computer network 103, and the data server 101 may access an advertisement database 104.

The data server 101 may be a computer system, including a central processing unit (CPU) 1011, a memory 1012, an interface 1013 to external storage devices, an interface 1014 to the Internet, a user interface 1015, etc. All of these elements may be interconnected by a system bus 1016. Alternatively, the data server 101 may include multiple computer systems each configured to accomplish certain tasks and coordinate with other computer systems to perform the method of the present invention.

The CPU 1011 may control the data server 101 to carry out a number of processes, including but not limited to the one described below with reference to FIG. 3. The processes may be stored in the memory 1012. In one example, the CPU 1011 may receive a search request over the computer network 103, parse one or more search term(s) from the search request, identify web pages relevant to the search term(s), determine relevance of the web pages to the search terms, rank the web pages, and generate a result page with the web pages being displayed as a list of search results at one part of the result page, e.g., the left side.

The data server 101 may also access the advertisement database 104 via the interface 1013 to obtain advertisements relevant to the search term(s), rank the advertisements (e.g., according to the service fee rates) and display the advertisements as a list of advertisements on another part of the result page, e.g., the right side.

The user terminals 102-1, 102-2, . . . 102-n may be a desktop computer, a laptop computer, a personal digital assistant (PDA), a smartphone, a set top box or any electronic devices having access to the computer network 103. A user terminal may have a CPU 1021, a memory 1022, a user interface 1023, an interface 1024 to the Internet, a display controller 1025 and a display 1026, interconnected via a bus 1027. The user terminal may also have a browser application configured to receive and display web pages, which may include text, graphics, multimedia, etc. The web pages may be based on, e.g., HyperText Markup Language (HTML) or extensible markup language (XML).

The advertisement database 104 may store information about a number of advertisers which have contracts with a search engine service provider running the data server 101. The information about an advertiser may include, e.g., one or more keywords about its products or services, the service fee for a click (Pay Per Click) or an impression (Pay Per Impression), the expiration date of its contract with the search engine service provider, and the billing information. Although the advertisement database 104 is shown as a device external to the data server 101, it should be understood that information about advertisers may be saved in an internal memory device in the data server 101.

The computer network 103 may be, e.g., the Internet. Network connectivity may be wired or wireless, using one or more communications protocols, as will be known to those of ordinary skill in the art.

Figure 2A:
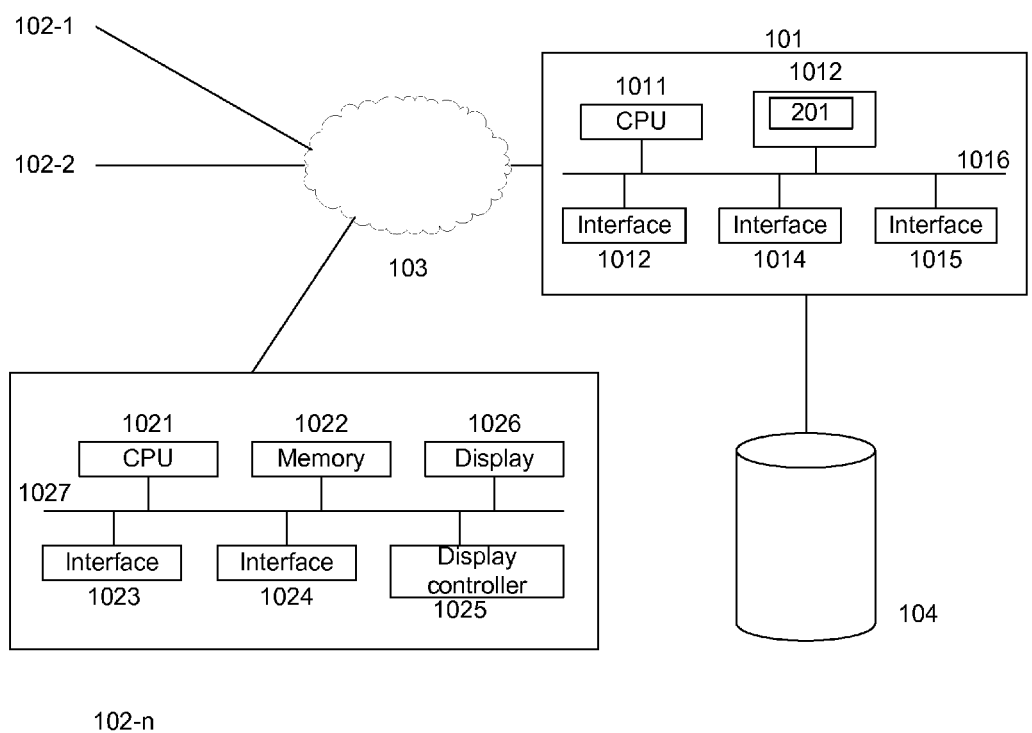
FIG. 2A illustrates a system for displaying online advertisements according to one embodiment of the present invention.

FIG. 2A illustrates a system for presenting online advertisements according to one embodiment of the present invention.

A screen control module 201 may be installed in the data server 101. The screen control module 201 may be a program stored in the memory 1012. After a result page, including a list of search results on its left side and a list of advertisements on its right side, is generated and displayed to a user, the screen control module 201 may detect the part of the result page that is on the currently displayed screen, and move at least a part of the list of advertisements into the currently displayed screen. In one embodiment, the top of the advertisement list may be aligned with the top of the screen, so that the first advertisement in the list may always be displayed at the upper right corner of the screen, no matter whether the user is scrolling down, scrolling up, or looking at a certain part of the result page.

In one embodiment, the screen control module 201 may repeat the advertisement list in cycles, so that each advertisement in the list may have substantially equal opportunities for being displayed on the screen and the part of the result page for advertisements are almost always filled. The advertisement list and its copies may be statically displayed on the result page till the end of the result page or being filled in on the fly.

In one embodiment, instead of repeating the list of the advertisements generated according to the search terms, the screen control module 201 may interact with the CPU 1011 and determine the user's interest according to parts of the result page which the user has moused over or clicked on, and dynamically generate an updated advertisement list fine tuned to the user's interest and display the updated advertisement list on the screen. The details about generating and displaying an updated advertisement list fine tuned to a user's interest are described in the co-pending U.S. patent application Ser. No. 12/187,324, entitled Method and System for Dynamically Updating Online Advertisements, which is incorporated herein by reference in its entirety.

Figure 2B:
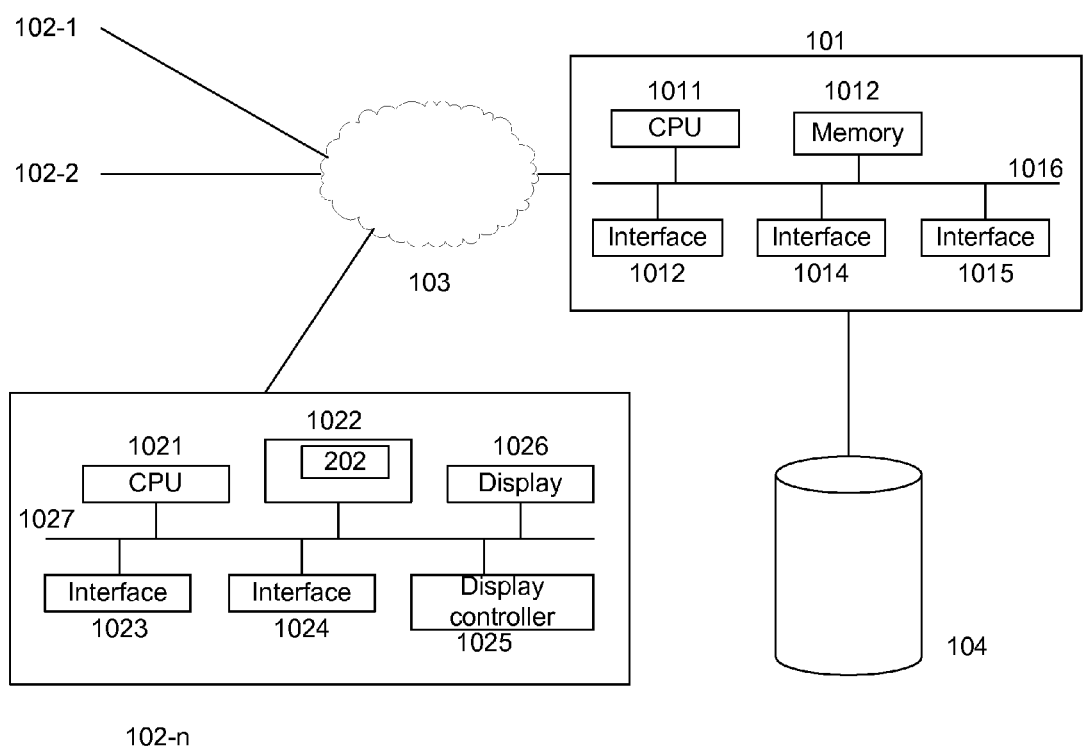
FIG. 2B illustrates a system for displaying online advertisements according to one embodiment of the present invention.

FIG. 2B illustrates a system for displaying online advertisements according to one embodiment of the present invention. Instead of being installed in the data server 101, a screen control module 202 may be installed in a user terminal 102n, and may interact with a CPU 1021 and a display controller 1025 of the user terminal 102n to enable at least a part of the advertisement list to be displayed on the currently displayed screen. The screen control module 202 may be a program stored in a memory 1022 in the user terminal 102n.

It should be understood that the screen control module 202 in FIG. 2B, as well as the screen control module 201 in FIG. 2A, may be accomplished by hardware or firmware as well.

Figure 3:
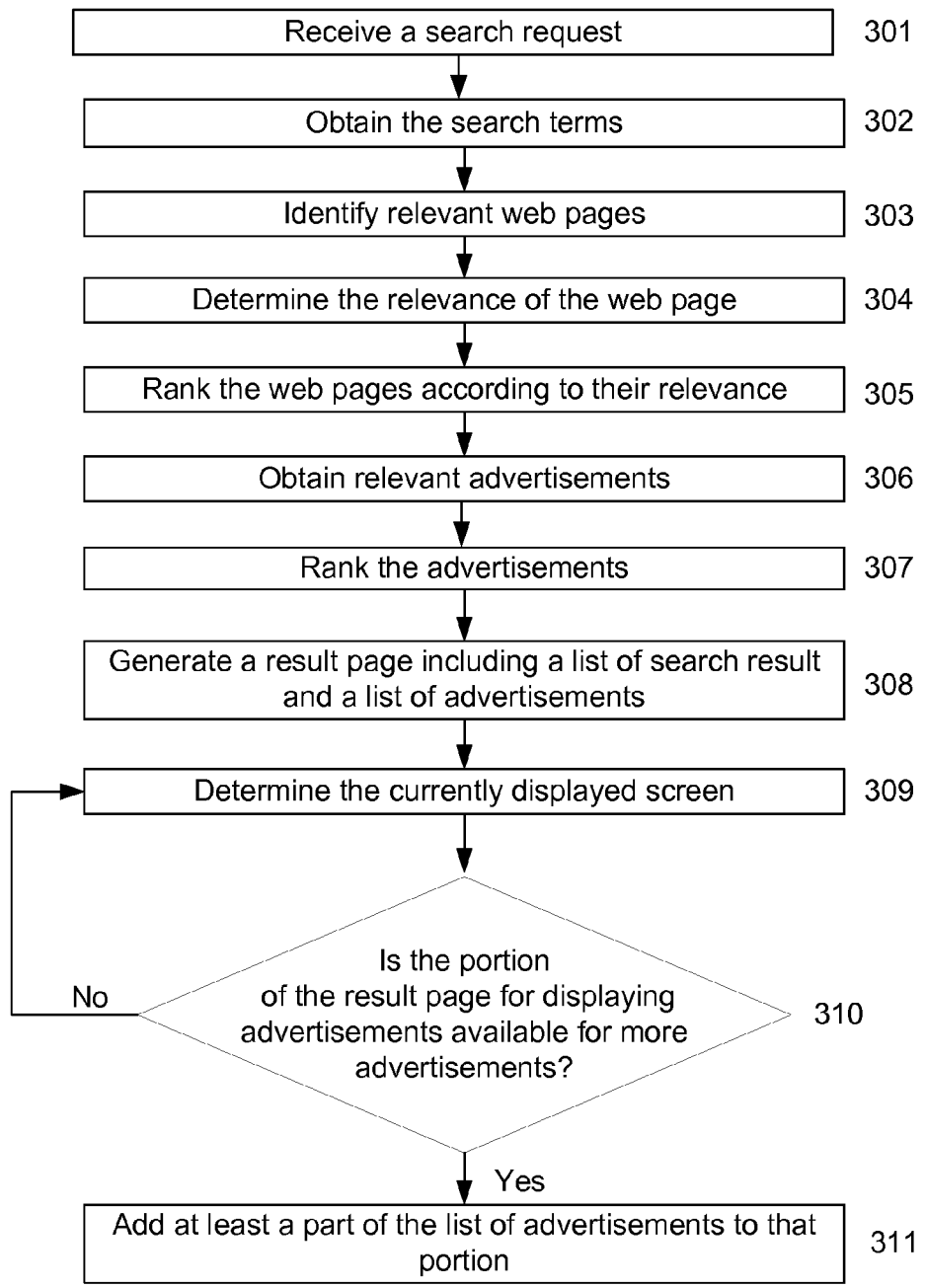
FIG. 3 illustrates a flow chart of a method for displaying online advertisements according to one embodiment of the present invention.

FIG. 3 illustrates a flow chart of a method for presenting online advertisements according to one embodiment of the present invention. The method may be used with the systems shown in FIGS. 2A and 2B.

At 301, the data server 101 may receive a search request from a user terminal 102n. The search request may include one or more search terms.

At 302, the data server 101, or some portion thereof such as the CPU 1011, alone or in conjunction with other elements of the server 101, may parse the search request and abstract the one or more search terms.

At 303, the data server 101 may search the Internet to identify web pages which may contain the search terms or may be relevant to the search terms.

At 304, the data server 101 may determine the relevance of the web pages using one or more algorithms.

At 305, the data server 101 may rank the web pages according to their relevance.

At 306, the data server 101 may search the advertisement database 104 to obtain advertisements relevant to the search terms.

At 307, the data server 101 may rank the advertisements according to, e.g., service fee rates.

At 308, the data server 101 may send data to the user terminal 102n, so that the user terminal 102n may present on its display 1026 a list of search results and a list of advertisements on one or more result pages. The list of search results may include information about the relevant web pages. In one example, a result page may have a left column for displaying the list of search results, starting from the most relevant search result, and a right column for displaying the list of advertisements, starting from the advertisement with the highest service fee rate. The list of search results may expand over a number of result pages, and a result page may be longer than a screen.

In another example, the list of search results may be displayed in a right column of the result page, and the list of advertisements may be displayed in a left column of the result page.

At 309, the screen control module 201 or 202 may determine the currently displayed screen.

At 310, the screen control module 201 or 202 may determine whether the right column of the currently displayed screen, which is used to display advertisements, is available to display more advertisements. If not, the process may return to 309.

Otherwise, at 311, the screen control module 201 or 202 may display at least a part of the advertisement list in the right column of the currently displayed page.

In one embodiment, the top of the list of advertisements may be aligned with the top of the currently displayed screen, so that the first advertisement in the list of advertisements may almost always be displayed at the upper right corner of the currently displayed screen.

In one embodiment, the screen control module 201 or 202 may repeat the advertisement list in cycles, so that the first line of the advertisement list will follow the last line of the advertisement list. The advertisement list and its copies may be statically displayed on the result page until the end of the result page, or be dynamically filled in the currently displayed screen when the user scrolls up and down the result page.

In one embodiment, an updated advertisement list may be generated and displayed in the right column of the currently displayed screen. The updated advertisement list may be fine tuned to the user's interest according to parts of the result page the user has clicked on or moused over. The updated advertisement list may be different from the advertisement list generated at 308 in, e.g., the advertisements displayed or their order. The method of generating and displaying an updated advertisement list fine tuned to a user's interest is described in the co-pending U.S. patent application Ser. No. 12/187,324, entitled Method and System for Dynamically Updating Online Advertisements, which is incorporated herein by reference in its entirety.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A method for displaying online advertisements, the method comprising:
   receiving a search term from a user terminal;
   identifying a plurality of web pages including the search term;
   selecting a plurality of advertisements matching the search term;
   generating, by a processor, a result page, with information from the web pages shown in a first portion of the result page, and the advertisements shown in a second portion of the result page, wherein the first portion of the result page includes an extended part that extends beyond a first display screen into a second display screen;
   responsive to scrolling of the result page beyond the first display screen to the second display screen, moving the second portion to the second display screen; and
   after moving the second portion, displaying the second portion along with the extended part of the first portion in the second display screen.

2. The method of claim 1, wherein the advertisements are shown as a ranked list in the second portion of the result page, and an upper edge of the list is aligned with an upper edge of the second display screen of the result page.

3. The method of claim 1, wherein the advertisements are shown as a ranked list in the second portion of the result page, and the ranked list is repeated to fill the second portion of the result page that extends beyond the first display screen.

4. The method of claim 1, wherein the advertisements are shown as a ranked list in the second portion of the result page, and the at least one advertisement is added to the second portion of the result page in the second display screen so that the list of advertisements is repeated in the second portion of the result page.

5. The method of claim 1, wherein the information from the web pages is shown in a left column of the result page, and the advertisements are shown in a right column of the result page.

6. The method of claim 1, wherein the advertisements are shown in a left column of the result page.

7. The method of claim 1, further comprising: adding an updated advertisement list in the second portion of the result page in the second display screen based on user input.

8. A method, comprising:
   receiving a search term from a user terminal;
   identifying a plurality of web pages including the search term;
   selecting a plurality of advertisements matching the search term;
   generating, by a processor, a result page, with information from the web pages shown in a first portion of the result page, and the advertisements shown in a second portion of the result page, wherein the first portion of the result page includes an extended part that extends beyond a first display screen into a second display screen; and
   responsive to scrolling of the result page beyond the first display screen to the second display screen, moving the second portion to the second display screen, wherein the moving of the second portion follows the scrolling of the result page; and
   after moving the second portion, displaying the second portion along with the extended part of the first portion in the second display screen.

9. The method of claim 8, wherein the advertisements are shown as a ranked list in the second portion of the result page, and an upper edge of the list is aligned with an upper edge of the second display screen of the result page.

10. The method of claim 8, wherein the advertisements are shown as a ranked list in the second portion of the result page, and the ranked list is repeated to fill the second portion of the result page.

11. The method of claim 8, wherein the method further comprising: adding an updated advertisement list in the second portion of the result page in the second display screen based on user input.

12. The method of claim 1, wherein the first display screen and the second display screen overlap or are adjacent.

13. The method of claim 8, wherein the first display screen and the second display screen overlap or are adjacent.

14. A system, comprising:
   a receiver configured to receive a search term from a user terminal; and
   a circuit communicatively coupled to the receiver, the circuit configured to:
   identify a plurality of web pages including the search term;
   select a plurality of advertisements matching the search term;
   generate a result page, with information from the web pages shown in a first portion of the result page, and the advertisements shown in a second portion of the result page, wherein the first portion of the result page includes an extended part that extends beyond a first display screen into a second display screen, and wherein the second portion does not extend into the second display screen until moved;

responsive to scrolling of the result page beyond the first display screen to the second display screen, move the second portion to the second display screen, wherein the moving of the second portion is proportionate to the scrolling of the result page; and after the moving of the second portion, display the second portion along with the extended part of the first portion in the second display screen.

15. The system of claim 14, wherein the advertisements are shown as a ranked list in the second portion of the result page, and an upper edge of the list is aligned with an upper edge of the second display screen of the result page.

16. The system of claim 14, wherein the advertisements are shown as a ranked list in the second portion of the result page, and the ranked list is repeated to fill the second portion of the result page that extends beyond the first display screen.

17. The system of claim 14, wherein the advertisements are shown as a ranked list in the second portion of the result page, and the at least one advertisement is added to the second portion of the result page in the second display screen so that the list of advertisements is repeated in the second portion of the result page.

18. The system of claim 14, wherein the first display screen and the second display screen overlap or are adjacent.

19. The method of claim 1, wherein the moving of the second portion follows the scrolling of the result page proportionately.

20. The method of claim 1, wherein the second portion does not extend into the second display screen until moved in response to the scrolling of the result page beyond the first display screen.

\* \* \* \* \*